(12) United States Patent
Fukushima et al.

(10) Patent No.: US 10,781,010 B2
(45) Date of Patent: Sep. 22, 2020

(54) HOLLOW CONTAINER AND METHOD FOR MANUFACTURING HOLLOW CONTAINER

(71) Applicant: TOPPAN PRINTING CO., LTD., Tokyo (JP)

(72) Inventors: Hideo Fukushima, Tokyo (JP); Makoto Takahashi, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 347 days.

(21) Appl. No.: 15/450,340

(22) Filed: Mar. 6, 2017

(65) Prior Publication Data

US 2017/0174381 A1    Jun. 22, 2017

Related U.S. Application Data

(63) Continuation of application No. PCT/JP2015/075413, filed on Sep. 8, 2015.

(30) Foreign Application Priority Data

Sep. 8, 2014   (JP) ................ 2014-182126

(51) Int. Cl.
    *B32B 1/02*     (2006.01)
    *B65D 1/02*     (2006.01)
    (Continued)

(52) U.S. Cl.
    CPC ........ *B65D 1/0207* (2013.01); *B29C 49/0005* (2013.01); *B29C 49/02* (2013.01); *B29C 49/12* (2013.01); *B29C 49/6409* (2013.01); *B65D 81/24* (2013.01); *C08J 5/00* (2013.01); *C08L 23/02* (2013.01); *C08L 23/06* (2013.01); *C08L 23/26* (2013.01); *C08L 77/06* (2013.01); *B29B 11/12* (2013.01); *B29B 2911/14426* (2013.01); *B29B 2911/14633* (2013.01);
    (Continued)

(58) Field of Classification Search
    CPC .......... B32B 27/06; B32B 27/32; C08L 23/04
    USPC ................... 428/34.1, 35.7; 525/178
    See application file for complete search history.

(56) References Cited

U.S. PATENT DOCUMENTS

2007/0049692 A1\*   3/2007   Maruo ............... B32B 27/08
                                                                  525/178

FOREIGN PATENT DOCUMENTS

JP     2003-127211     5/2003
JP     2011-162684     8/2011
    (Continued)

OTHER PUBLICATIONS

International Search Report dated Dec. 15, 2015 of the corresponding International Application No. PCT/JP2015/075413.
(Continued)

*Primary Examiner* — Ellen S Hock

(57) ABSTRACT

A single-layer hollow container includes: a resin composition that is formed of 60 to 90% by mass of polyolefin, 2 to 35% by mass of meta-xylylene group-containing polyamides, and 5 to 30% by mass of modified polyolefin. The meta-xylylene group-containing polyamides are dispersed insularly in the polyolefin, and in a case where each of a vertical length and a horizontal length of the meta-xylylene group-containing polyamide in an initial state is 1, the vertical length of the meta-xylylene group-containing polyamide in the hollow container ranges from 3.3 to 15.8 and the horizontal length ranges from 0.5 to 2.0.

6 Claims, 7 Drawing Sheets

(51) Int. Cl.

| | |
|---|---|
| *B29C 49/02* | (2006.01) |
| *B29C 49/12* | (2006.01) |
| *C08L 77/06* | (2006.01) |
| *C08J 5/00* | (2006.01) |
| *C08L 23/26* | (2006.01) |
| *C08L 23/02* | (2006.01) |
| *B29C 49/00* | (2006.01) |
| *B29C 49/64* | (2006.01) |
| *B65D 81/24* | (2006.01) |
| *C08L 23/06* | (2006.01) |
| *B29L 31/00* | (2006.01) |
| *B29B 11/12* | (2006.01) |
| *B29K 23/00* | (2006.01) |
| *B29K 77/00* | (2006.01) |

(52) U.S. Cl.
CPC .. *B29C 2049/028* (2013.01); *B29K 2023/065* (2013.01); *B29K 2077/00* (2013.01); *B29K 2995/0067* (2013.01); *B29K 2995/0069* (2013.01); *B29L 2031/712* (2013.01); *B29L 2031/7158* (2013.01); *C08L 2205/03* (2013.01)

(56) References Cited

FOREIGN PATENT DOCUMENTS

| WO | WO 01/27203 A1 | 4/2001 |
| WO | WO 2006/115287 A1 | 11/2006 |
| WO | WO 2012/121295 A1 | 9/2012 |
| WO | WO 2014/103054 A1 | 7/2014 |

OTHER PUBLICATIONS

Extended European Search Report dated Jan. 19, 2018, in corresponding European Patent Application No. 15839992.3, 10 pgs.
Third Party Observations dated Feb. 14, 2019 in corresponding European Patent Application No. 15839992.3 (14 pages).

* cited by examiner

EXTRUDING DIRECTION →

EXTRUDING DIRECTION →

STRETCHING DIRECTION →

STRETCHING DIRECTION

HOLLOW CONTAINER AND METHOD FOR MANUFACTURING HOLLOW CONTAINER

CROSS REFERENCE TO RELATED APPLICATIONS

This application is a continuation application based on a PCT Patent Application No. PCT/W2015/075413, filed Sep. 8, 2015, whose priority is claimed on Japanese Patent Application No, 2014-182126, filed on Sep. 8, 2014, the entire content of which are hereby incorporated by reference.

BACKGROUND OF THE INVENTION

Field of the Invention

The present invention relates to a hollow container and a method for manufacturing the hollow container.

Description of the Related Art

As packaging materials for protecting food, pharmaceutical products, precise electronic components, and the like, in order to prevent contents from being oxidized and deteriorated due to oxygen the outside air, oxygen barrier materials are used. As an oxygen barrier material in the related art, there is a known material obtained by coating a general plastic film or a general bottle with a substance having oxygen barrier performance. Moreover, in order to exhibit high oxygen barrier properties, there is a known oxygen barrier material obtained by vapor-depositing aluminum, silica, alumina, or the like in a film.

In the meantime, in regard to the packaging materials, the appearance, easiness of handling, the manufacturing cost, and the like are also considerably important. Among the packaging materials, plastic is light, is mostly transparent such that the content can be seen, is soft, and has strength as well. Therefore, plastic is an important material as a packaging material. Particularly, polyolefins such as polyethylene (PE) and polypropylene (PP) are often used as materials for packing.

However, since the polyolefins such as polyethylene (PE) and polypropylene (PP) have poor oxygen barrier properties, there is a problem in that the polyolefins cannot be used alone for preventing oxidization and deterioration.

In contrast, as plastics having the oxygen barrier properties, nylons (Ny), polyvinyl alcohol (PVA), ethylene vinyl alcohol copolymer resins (EVOH), polyvinylidene chloride (PVDC), and the like are known. In addition, among the nylons, nylon 6 is used the most for an oxygen barrier purpose. Particularly, so-called MX nylon formed of meta-xylylene-diamine/adipic acid is known as a material having higher oxygen barrier properties, among Ny-based films.

Incidentally, Japanese Unexamined Patent Application, First Publication No. 2011-162684 discloses a hollow container that is formed of a resin composition obtained by melting and mixing polyolefin, meta-xylylene group-containing polyamides, and modified polyolefin; and a method for manufacturing the same. Specifically, Japanese Unexamined Patent Application, First Publication No. 2011-162684 discloses that when the aforementioned resin composition is molded through a direct blow method, since the meta-xylylene group-containing polyamides can be dispersed in the resin composition in a flaky state, even if the hollow container has a single layer, excellent barrier properties can be obtained.

However, even in a case where the resin composition disclosed in PTL 1 is used as a raw material, there has been a problem in that a hollow container having a single layer and excellent barrier properties cannot be obtained through molding methods other than the direct blow method. That is, in order to obtain a single-layer hollow container having the excellent barrier properties, the aforementioned resin composition is required to be molded through the direct blow method.

Here, the direct blow method is a method in which a resin composition melted and mixed inside an extruder is extruded from a cylindrical die, a tubular melt (also referred to as parison) is formed, the melt is squeezed in a mold and is inflated through blowing of gas such as air, the inflated melt adheres to the inside of the mold, and a molding body is obtained.

However, in a case where the direct blow method is adopted when manufacturing hollow containers, only approximately one hundred hollow containers can be produced per hour, and there is a current demand for improvement of the productivity (mass productivity). In addition, even in a case where the direct blow method is adopted, in case where the required conditions for the oxygen barrier properties are strict, there are cases where it is difficult to satisfy such conditions with a single layer thereof.

Moreover, solvent barrier properties are required in hollow containers for keeping solvents such as agricultural chemicals. However, similar to the oxygen barrier properties, even though the resin composition disclosed in PTL 1 is used as a raw material, a hollow container having a single layer and excellent barrier properties cannot be obtained through molding methods other than the direct blow method. In addition, even in a case where the direct blow method is adopted, in a case where the required conditions for the solvent barrier properties are strict, there are cases where it is difficult to satisfy such conditions with a single layer thereof.

The present invention has been made in consideration of the foregoing circumstances and aims to provide a single-layer hollow container having excellent oxygen barrier properties and solvent barrier properties.

In addition, the present invention aims to provide a method for manufacturing a hollow container, in which productivity of the single-layer hollow container having excellent oxygen barrier properties and solvent barrier properties can be improved.

SUMMARY

In order to solve the foregoing problems, the present invention employs the following configurations.

According to a first aspect of the present invention, there is provided a hollow container including a resin composition that is formed of 60 to 90% by mass of polyolefin, 2 to 35% by mass of meta-xylylene group-containing polyamides, and 5 to 30% by mass of modified polyolefin. The meta-xylylene group-containing polyamides are dispersed insularly in the polyolefin, and in a case where each of the vertical length and the horizontal length of the meta-xylylene group-containing polyamide in an initial state is 1, the vertical length of the meta-xylylene group-containing polyamide in the hollow container ranges from 3.3 to 15.8 and the horizontal length ranges from 0.5 to 2.0.

In a case where the thickness of the meta-xylylene group-containing polyamide in the initial state is 1, the thickness of the meta-xylylene group-containing polyamide in the hollow container may range from 0.03 to 0.6.

In addition, when the average wall thickness of a body portion of the hollow container is 0.3 mm, oxygen permeability of the hollow container measured through the MOCON method may be equal to or less than 0.03 (ml/each/day).

In addition, the polyolefin may be high density polyethylene.

According to a second aspect of the present invention, there is provided a method for manufacturing a single-layer hollow container, including preparing a resin composition which is obtained by melting and mixing 60 to 90% by mass of polyolefin, 2 to 35% by mass of meta-xylylene group-containing polyamides, and 5 to 30% by mass of modified polyolefin; forming a preform by compression-molding the resin composition; stretching the preform; and blow-molding the stretched preform.

In addition, before the preform is stretched, the preform may be reheated.

The meta-xylylene group-containing polyamides may be dispersed insularly in the polyolefin, and in a case where each of the vertical length and the horizontal length of the meta-xylylene group-containing polyamide in an initial state is 1, the vertical length of the meta-xylylene group-containing polyamide after the blow molding may range 3.3 to 15.8 and the horizontal length may range from 0.5 to 2.0.

In a case where the thickness of the meta-xylylene group-containing polyamide in the initial state is 1, the thickness of the meta-xylylene group-containing polyamide after the blow molding may range from 0.05 to 0.6.

High density polyethylene may be used as the polyolefin.

According to the aspect of the present invention, it is possible to provide a hollow container which is a single-layer hollow container having excellent oxygen barrier properties and solvent barrier properties.

According to the aspect of the present invention, the method for manufacturing a hollow container includes a step of forming the preform by compression-molding the resin composition which can be obtained by melting and mixing the polyolefin, the meta-xylylene group-containing polyamides, and the modified polyolefin; a step of stretching the preform; and a step of blow-molding the stretched preform. Therefore, it is possible to improve the productivity of the single-layer hollow container having excellent oxygen barrier properties and solvent barrier properties.

DETAILED DESCRIPTION OF THE PREFERRED EMBODIMENTS

Figure 1A:
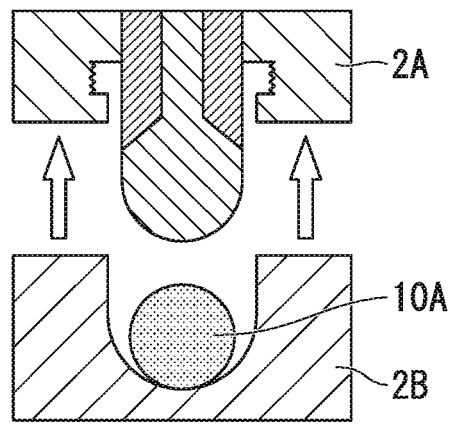
FIG. 1A is a cross-sectional view illustrating a step configuring a method for manufacturing a hollow container according to an embodiment of the present invention.
Figure 1A:
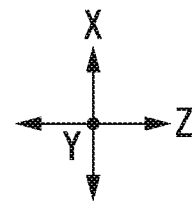

Hereinafter, with reference to the drawings, description will be given in detail regarding a method for manufacturing a hollow container according to an embodiment of the present invention, and the hollow container obtained through the manufacturing method.

In the drawings used in the following description, in order to make the features easy to understand, there are cases where the parts of the features are enlarged and illustrated for convenience. Therefore, the ratio of the size in each configuration element is not always the same as the actual ratio.

<Method for Manufacturing Hollow Container>

First, the method for manufacturing a hollow container according to the embodiment of the present invention will be described.

In the method for manufacturing a hollow container according to the present embodiment (hereinafter, will be simply referred to as "the manufacturing method"), a resin composition obtained by melting and mixing polyolefin, meta-xylylene group-containing polyamides, and modified polyolefin is used as a raw material of a molding body (hollow container).

"Polyolefin"

The polyolefin is not particularly limited. Materials covering a wide range of melt viscosity can be used. Specifically, for example, a linear low density polyethylene resin, a low density polyethylene resin, a medium density polyethylene resin, a high density polyethylene resin, an ultra-high molecular weight high density polyethylene resin, and a polypropylene resin can be used. Otherwise, a resin formed of a copolymer formed of two or more types of olefins selected from ethylene, propylene, butene, and the like, and a mixture thereof can be used.

"Meta-Xylylene Group-Containing Polyamide"

The meta-xylylene group-containing polyamide has a diamine unit and a dicarboxylic acid unit. When being contained in the resin composition, it is possible to apply the effect of enhancing the barrier performance molded hollow container.

The diamine configuring the meta-xylylene group-containing polyamide is not particularly limited. Specifically, for example, meta-xylylene-diamine, para-xylylene-diamine, 1,3-bis (aminomethyl) cyclohexane, 1,4-bis (aminomethyl) cyclohexane, tetramethylene-diamine, hexamethylene-diamine, nonane methylene-diamine, and 2-methyl-1,5-pentane-diamine can be used.

In the manufacturing method according to the present embodiment, for example, the meta-xylylene group-containing polyamides preferably contain equal to or more than 70 mol % of a meta-xylylene-diamine unit, more preferably contain equal to or more than 80 mol % thereof, and furthermore preferably contain equal to or more than 90 mol % thereof. When the meta-xylylene group-containing polyamides containing equal to or more than 70 mol % of the meta-xylylene-diamine unit are used in the resin composition, the gas barrier properties of a molded hollow container can be efficiently enhanced.

The dicarboxylic acid unit configuring the meta-xylylene group-containing polyamide is not particularly limited. Specifically, for example, alicyclic dicarboxylic acid such as α,ω-aliphatic dicarboxylic acid, 1,3-cyclohexane dicarboxylic acid, and 1,4-cyclohexane dicarboxylic acid; and aromatic dicarboxylic acid such as terephthalic acid, isophthalic acid, orthophthalic acid, xylylene dicarboxylic acid, and naphthalene dicarboxylic acid can be used. Among these, isophthalic acid, 2,6-naphthalenedicarboxylic acid, and the like are preferable because polyamide having excellent barrier properties can be easily obtained without hindering polycondensation reaction when the meta-xylylene group-containing polyamides are produced.

In e manufacturing method according to the present embodiment, for example, the meta-xylylene group-containing polyamides preferably contain equal to or more than 50 mol % of the dicarboxylic acid unit such as α,ω-aliphatic dicarboxylic acid, more preferably contain equal to or more than 60 mol % thereof, and further more preferably contain equal to or more than 70 mol % thereof. When the dicarboxylic acid unit is contained equal to or more than 70 mol %, the crystallinity of the meta-xylylene group-containing polyamides can be restrained from being excessively deteriorated.

Specifically, for example, the α,ω-aliphatic dicarboxylic acid includes suberic acid, adipic acid, azelaic acid, sebacic acid, and dodecanoic acid. Among these, due to the excellent performance of retaining favorable gas barrier properties and crystallinity, adipic acid and sebacic acid are preferably used.

Within a range not affecting the effect of the present invention as copolymerization units other than the diamine unit and the dicarboxylic acid unit, the meta-xylylene group-containing polyamides may contain lactams such as ε-caprolactam and laurolactam, aliphatic aminocarboxylic acids such as aminocaproic acid and aminoundecanoic acid, and aromatic aminocarboxylic acid such as para-aminomethylbenzoic acid.

The meta-xylylene group-containing polyamides can be produced by adopting a melt polycondensation (melt polymerization) method. Specifically, for example, there is a method in which the temperature of nylon salt formed of diamine and dicarboxylic acid is raised in the presence of water and under pressure, and while the added water and condensation water are eliminated, polymerization is performed in a molten state.

In addition, the meta-xylylene group-containing polyamides can be produced through a method in which diamine is directly added to dicarboxylic acid in a molten state and polycondensation is performed. In this case, it is preferable to maintain the reaction system in a uniform liquid state. Specifically, while the diamine is continuously added to the dicarboxylic acid, it is preferable to raise the temperature of the reaction system and perform the polycondensation reaction such that the reaction temperature does not fall below the melting points of oligoamide and polyimide to be generated.

A phosphorus atom-containing compound may be contained within the polycondensation system of the meta-xylylene group-containing polyamides. When the phosphorus atom-containing compound is contained within the polycondensation system of the meta-xylylene group-containing polyamides, it is possible to obtain the effect of promoting an amidation reaction and the effect of preventing staining at the time of polycondensation.

The phosphorus atom-containing compound is not particularly limited. Specifically, for example, dimethyl phosphinic, acid, phenulmethylphosphinic acid, hypophosphorous acid, sodium hypophosphite, potassium hypophosphite, lithium hypophosphite, ethyl hypophosphite, phenylphosphonous acid, sodium phenylphosphonate, potassium phenylphosphonate, lithium phenylphosphonous acid, ethyl phenylphosphonous acid, phenylphosphonic acid, ethylphosphonic acid, sodium phenylphosphonate, phenylphosphonic acid potassium, phenylphosphonic acid lithium, phenylphosphonic acid diethyl, ethyl phosphonic acid sodium phosphonate, potassium ethyl phosphonate, phosphorous acid, sodium hydrogen phosphite, sodium phosphite, triethyl phosphite, triphenyl phosphite, and pyrophosphorous acid can be used. Among these, metal hypophosphite such as sodium hypophosphite, potassium hypophosphite, and lithium hypophosphite exhibits a high effect of promoting the amidation reaction and is preferable due to the excellent effect of preventing staining, and sodium hypophosphite is particularly preferable.

The addition amount of the phosphorus atom-containing compound added to the meta-xylylene group-containing polyamides preferably ranges from 1 to 500 ppm in the conversion of phosphorus atom concentration in the meta-xylylene group-containing polyamides, more preferably ranges from 5 to 450 ppm, and further more preferably ranges from 10 to 400 ppm. When the addition amount of the phosphorus atom compound is set within the aforementioned range, staining of the xylylene group-containing polyamides in the polycondensation can be prevented.

Within the polycondensation system of the meta-xylylene group-containing polyamides, together with the phosphorus atom-containing compound, it is preferable to contain an alkali metal compound or an alkaline earth metal compound. When the alkali metal compound or the alkaline earth metal compound coexists with the phosphorus atom-containing compound, the rate of the amidation reaction can be adjusted.

The alkali metal compound and the alkaline earth metal compound are not particularly limited. Specifically, for example, hydroxide of alkali metal and alkaline earth metal, such as lithium hydroxide, sodium hydroxide, potassium hydroxide, rubidium hydroxide, cesium hydroxide, magnesium hydroxide, calcium hydroxide, and barium hydroxide; and acetate of alkali metal and alkaline earth metal, such as lithium acetate, sodium acetate, potassium acetate, rubidium acetate, cesium acetate, magnesium acetate, calcium acetate, and barium acetate can be used.

In a case where the alkali metal compound or the alkaline earth metal compound is added to the meta-xylylene group-containing polyamides, the value obtained by dividing the number of moles of the alkali metal compound or the alkaline earth metal compound by the number of moles of the phosphorus atom-containing compound preferably ranges from 0.5 to 2.0, more preferably ranges from 0.6 to 1.8, and further more preferably ranges from 0.7 to 1.5. When the addition amount of the alkali metal compound or the alkaline earth metal compound is set within the aforementioned range, the effect of promoting the amidation reaction can be obtained due to the phosphorus atom-containing compound, and generation of gel can be restrained.

The meta-xylylene group-containing polyamides obtained through the melt polycondensation are thereby taken out, and after being pelletized, are dried and used. In addition, in order to further enhance the degree of polymerization, solid phase polymerization may be performed. A heating apparatus used in drying or the solid phase polymerization is not particularly limited. A known method and a known apparatus can be used. As such a heating apparatus, specifically, for example, a continuous heating and drying apparatus; a rotary drum type-heating apparatus called a tumble dryer, a conical dryer, and a rotary dryer; and a cone-type heating apparatus called a nauta mixer internally provided with a rotor blade can be used. Among these, since the inside of the system can be sealed and the polycondensation is likely to proceed in a state where oxygen causing staining is eliminated, a batch-type heating apparatus is useful particularly in a case of performing the solid phase polymerization of polyimide.

Within a range not affecting the effect of the present embodiment, the meta-xylylene group-containing polyamides may contain an oxidant inhibitor; an additive such as a matting agent, a heat stabilizer, a weathering stabilizer, an ultraviolet absorber, a nucleating agent, a plasticizer, a flame retardant, an antistatic agent, a coloring inhibitor, a lubricant, and a gelling inhibitor; clay such as layered silicate; and a nanofiller. In addition, for the purpose of reforming the xylylene group-containing polyimide, as necessary, various types of polyamides such as amorphous nylon having nylon 6 or nylon 66 and aromatic dicarboxylic acid as a monomer, and a modified resin thereof; polyolefin and a modified resin thereof, air elastomer having styrene within the skeleton; and the like may be added.

"Modified Polyolefin"

In the modified polyolefin used in the man g method according to the present embodiment, the aforementioned polyolefin is graft-modified by using unsaturated carboxylic acid or the anhydride thereof. Generally, the modified polyolefin is widely used as an adhesive resin.

As the unsaturated carboxylic acid or the anhydride thereof, specifically, for example, acrylic acid, methacrylic acid, α-ethyl acrylic acid, maleic acid, fumaric acid, itaconic acid, citraconic acid, tetrahydrophthalic acid, chloromaleic acid, butenylsuccinic acid; and the acid anhydride thereof can be used. Among these, it is preferable to use maleic acid and maleic anhydride.

The method for obtaining the modified polyolefin by graft-copolymerizing the aforementioned unsaturated carboxylic acid and the anhydride thereof with polyolefin is not particularly limited. It is possible to use various types of known methods in the related art. Specifically, for example, it is possible to adopt a method in which polyolefin is melted by using an extruder or the like and is copolymerized by adding a graft monomer, a method in which polyolefin is dissolved in a menstruum and is copolymerized by adding a graft monomer, and a method in which polyolefin is caused to be an aqueous suspension and is copolymerized by adding a graft monomer thereafter.

"Resin Composition"

In the manufacturing method according to the present embodiment, the content of the polyolefin in the resin composition preferably ranges from 60 to 90% by mass with respect to the total of 100% by mass of the polyolefin, the meta-xylylene group-containing polyamides, and the modified polyolefin (that is, the resin composition 100% by mass). When the content of the polyolefin in the resin composition is set within the aforementioned range, deterioration of the strength of the container blended with the meta-xylylene group-containing polyamides can be minimized.

In addition, the content of the meta-xylylene group-containing polyamides in the resin composition preferably ranges from 2 to 35% by mass with respect to the total of 100% by mass of the polyolefin, the meta-xylylene group-containing polyamides, and the modified polyolefin (that is, the resin composition 100% by mass). When the meta-xylylene group-containing polyamides in the resin composition are set within the aforementioned range, the barrier performance of the container can be efficiently enhanced, and deterioration of the strength of the container can be restrained within a practical range.

In addition, the content of the modified polyolefin in the resin composition preferably ranges from 5 to 30% by mass with respect to the total of 100% by mass of the polyolefin, the meta-xylylene group-containing polyamides, and the modified polyolefin (that is, the resin composition 100% by mass). When the modified polyolefin in the resin composition is set within the aforementioned range, adhesive properties between the polyolefin and the meta-xylylene group-containing polyamide having no adhesive properties can be improved, and thus, the strength of the container can be enhanced.

In addition, in mass ratio, the content of the modified polyolefin with respect to the meta-xylylene group-containing polyamides in the resin composition preferably ranges from 0.8 to 5.0 times, more preferably ranges from 1.0 to 4.5 times, and further more preferably ranges from 1.0 to 4.0 times. When the content of the modified polyolefin is set within the aforementioned range, the strength of the container can be enhanced.

In addition to the three components of the aforementioned polyolefin, the meta-xylylene group-containing polyamides, and the modified polyolefin, for the purpose of reforming, the hollow container obtained through the manufacturing method according to the present embodiment may contain a thermoplastic elastomer; various types of copolymerized polyolefins such as ethylene-ethyl acrylate (EEA) and ethylene-methyl acrylate (EMA); an ionomer; and the like.

Moreover, as described below, burrs generated during steps of manufacturing a hollow container, and pulverized materials of defective products failed to be merchandise may be mixed together.

In the manufacturing method for the present embodiment, the aforementioned resin composition is adopted as raw material, and a hollow container which is a molded product is manufactured through a compression stretch blow method.

"Compression Stretch Blow Method"

As illustrated in FIGS. 1A to 1E, the compression stretch blow method is schematically configured to include a step of forming a preform (precursor) through compression molding, a step of stretching the preform, and a step of blow-molding the stretched preform. In addition, as an apparatus applied in the compression stretch blow method, for example, it is possible to use a known apparatus disclosed in the technical literature (Published Japanese Translation No. 2011-520643 of the PCT International Publication).

(Compression Molding Step)

In the manufacturing method for the present embodiment, specifically, first, as illustrated in FIG. 1A, for example, a resin composition (melt temperature of 238° C.) 10A obtained by melting and kneading the aforementioned polyolefin, meta-xylylene group-containing polyamides, and modified polyolefin in an extruder (not illustrated) of which the temperature is set to 240° C. is inserted into a mold 2B for forming a preform, via an adapter (not illustrated).

Figure 2A:
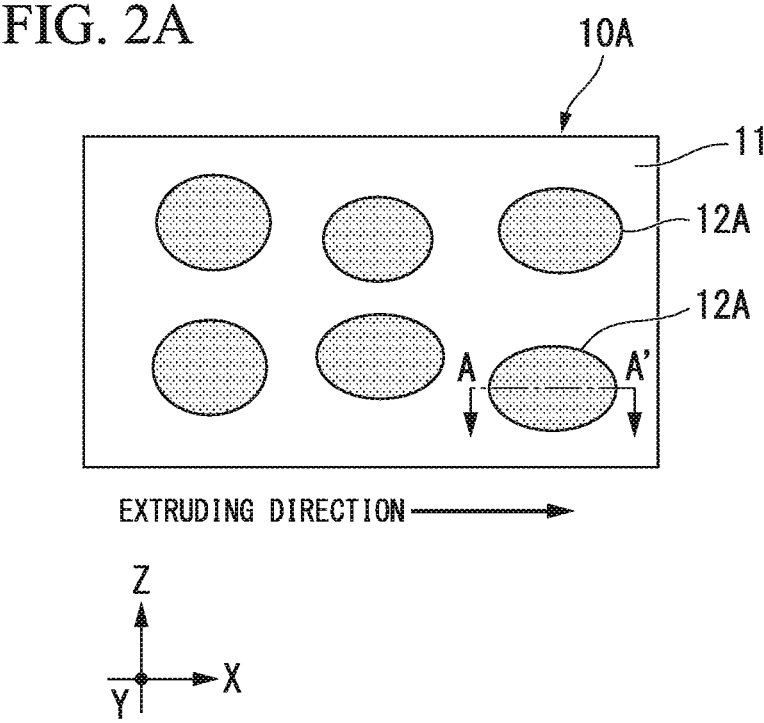
FIG. 2A is an enlarged view of a cross section of a resin composition illustrated in FIG. 1A.

Here, FIG. 2A illustrates a cross-sectional view of the resin composition 10A inserted into the mold 2B for forming a preform. As illustrated in FIG. 2A, in the resin composition 10A melted and kneaded in the extruder, the dispersion state of meta-xylylene group-containing polyamides 12A in polyolefin 11 exhibits a state of large sea islands. In other words, in the resin composition 10A, the meta-xylylene group-containing polyamides 12A are coarsely dispersed in the polyolefin 11.

Figure 2B:
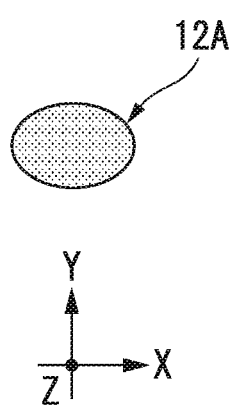
FIG. 2B is across-sectional view taken along line A-A' illustrated in FIG. 2A.

In addition, FIG. 2B illustrates a cross section taken along line A-A' illustrated in FIG. 2A. As illustrated in FIGS. 2A and 2B, any cross section of the meta-xylylene group-containing polyamides 12A in the resin composition 10A has a shape close to a circle, that is, a shape close to a generally spherical body.

Figure 1B:
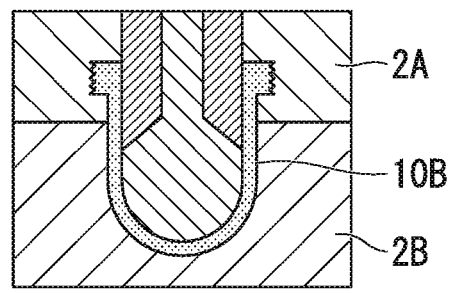
FIG. 1B is a cross-sectional view illustrating a step configuring the method for manufacturing a hollow container according to the embodiment of the present invention.
Figure 1B:
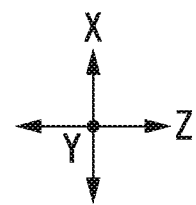

Next, as illustrated in FIG. 1B, the molds 2A and 2B are closed under low pressure (for example, approximately 784 kPa), and the resin composition is heated (mold temperature: approximately 80° C.) After gas drainage is performed, the molds 2A and 2B are closed under high pressure (mold clamping pressure: approximately 1960 kPa), and the resin flows and is solidified due to heat of the mold, thereby forming a preform 10B.

Figure 3A:
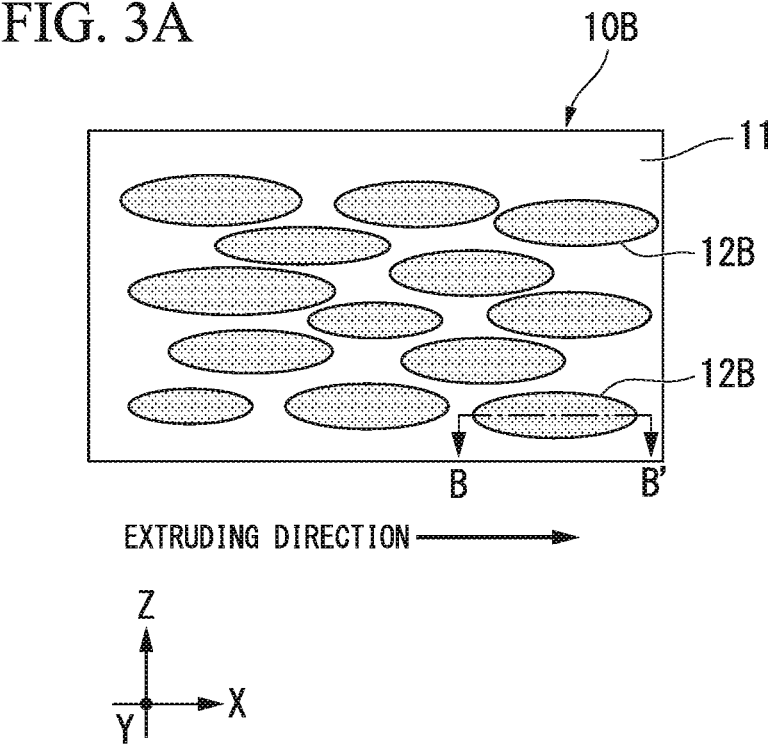
FIG. 3A is an enlarged view of a cross section of a preform illustrated in FIG. 1B.

Here, FIG. 3A illustrates a cross-sectional view of the formed preform 10B. As illustrated in FIG. 3A, in the preform 10B, the dispersion state of meta-xylylene group-containing polyamides 12B in the polyolefin 11 exhibits a state of small sea islands. In other words, in the preform 10B, the meta-xylylene group-containing polyamides 12B are densely dispersed in the polyolefin 11.

Figure 3B:
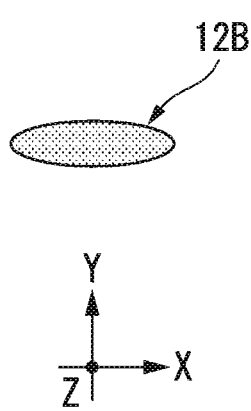
FIG. 3B is a cross-sectional view taken along line B-B' illustrated in FIG. 3A.

In addition, FIG. 3B illustrates a cross section taken along line B-B' illustrated in FIG. 3A. As illustrated in FIGS. 3A and 3B, any cross section of the meta-xylylene group-containing polyamides 12B in the preform 10B has an elliptic shape having the major axis in a direction parallel to an extruding direction, that is, a shape close to a generally ellipsoid body (flat spherical body).

(Stretching Step)

Next, after the mold 2B for forming a preform is replaced by a mold 2C for forming a hollow container, the formed preform 10B is retreated, and the temperature is adjusted for an appropriate temperature. Here, for example, the reheating temperature preferably ranges from 60 to 90° C., and the reheating time is preferably maintained from 3 to 10 seconds.

Figure 1C:
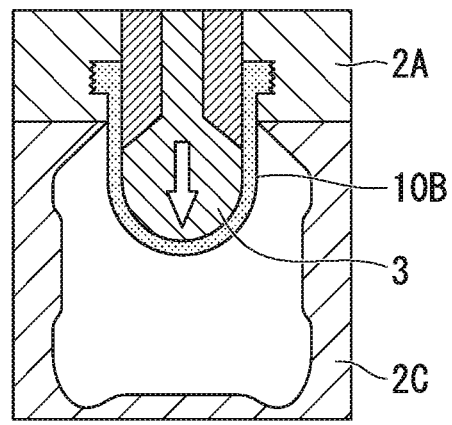
FIG. 1C is a cross-sectional view illustrating a step configuring the method for manufacturing a hollow container according to the embodiment of the present invention.
Figure 1C:
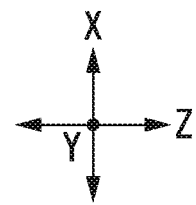
Figure 1D:
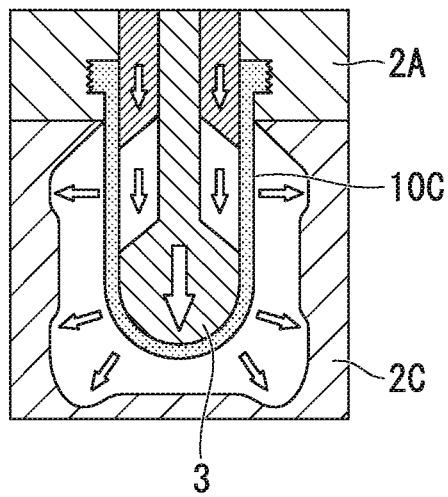
FIG. 1D is a cross-sectional view illustrating a step configuring the method for manufacturing a hollow container according to the embodiment of the present invention.

Next, as illustrated in FIGS. 1C and 1D the preform 10B after the temperature adjustment is stretched in the vertical direction (in the view, X-direction) by using a stretching rod 3. Accordingly, as illustrated in FIG. 1D, a stretched preform 10C is obtained. Here, for example, the stretch ratio preferably ranges from 1.1 to 3.5 times.

In the present embodiment, the X-direction (vertical direction) indicates a direction of stretching in the stretching step, a Z-direction (thickness direction) indicates the thickness direction of a final hollow container, and a Y-direction (transverse direction) indicates a direction perpendicular to the X-direction and the Z-direction.

Figure 4A:
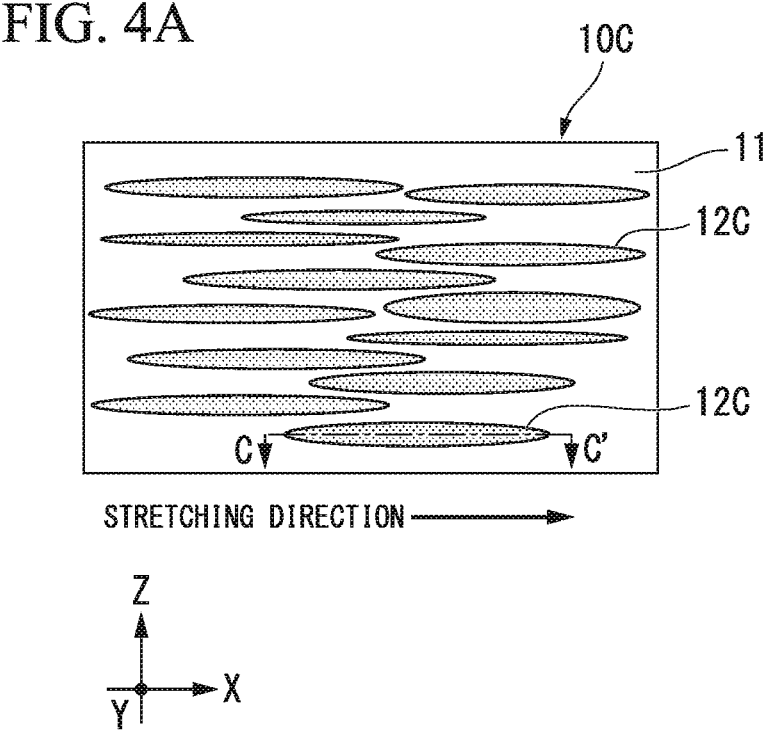
FIG. 4A is an enlarged view of a cross section of the stretched preform illustrated in FIG. 1D.

Here. FIG. 4A illustrates a cross-sectional view of the stretched preform 10C. As illustrated in FIG. 4A, in a preform 10C, the dispersion state of meta-xylylene group-containing polyamides 12C in the polyolefin 11 exhibits a layered state where the major axes of the meta-xylylene group-containing polyamides 12C stretched in needle shapes are aligned in a stretching direction. In other words, in the preform 10C, the meta-xylylene group-containing polyamides 12C are layered and dispersed in the polyolefin 11.

Figure 4B:
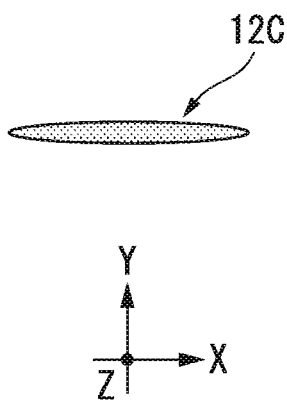
FIG. 4B is a cross-sectional view taken along life C-C' illustrated in FIG. 4A.

In addition, FIG. 4B illustrates a cross section taken along line C-C' illustrated in FIG. 4A. As illustrated in FIGS. 4A and 4B, any cross section of the meta-xylylene group-containing polyamides 12C in the preform 10C has an elliptically flattened shape having the major axis in a direction parallel to the stretching direction, that is, a shape close to a general needle shape (rod shape).

(Blow Molding Step)

Figure 1E:
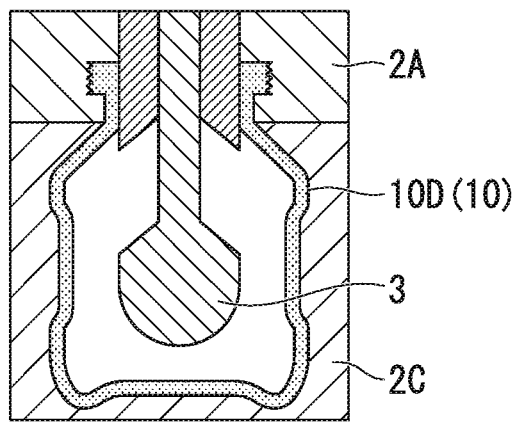
FIG. 1E is a cross-sectional view illustrating a step configuring the method for manufacturing a hollow container according to the embodiment of the present invention.

Next, as illustrated in FIGS. 1D and 1E, the stretched preform 10C is blow-molded. Specifically, in the mold 2C for forming a hollow container, high pressure air is supplied to the inside of the stretched preform 10C and is cooled while being inflated. Here, for example, the blow condition preferably ranges from 980 to 2942 kPa (lateral stretch ratio ranges from 1.0 to 2.5). In addition, for example, the cooling condition preferably ranges from 3 to 10 seconds. In this manner, as illustrated in FIG. 1E, a hollow container 10D (10) is formed.

Figure 5A:
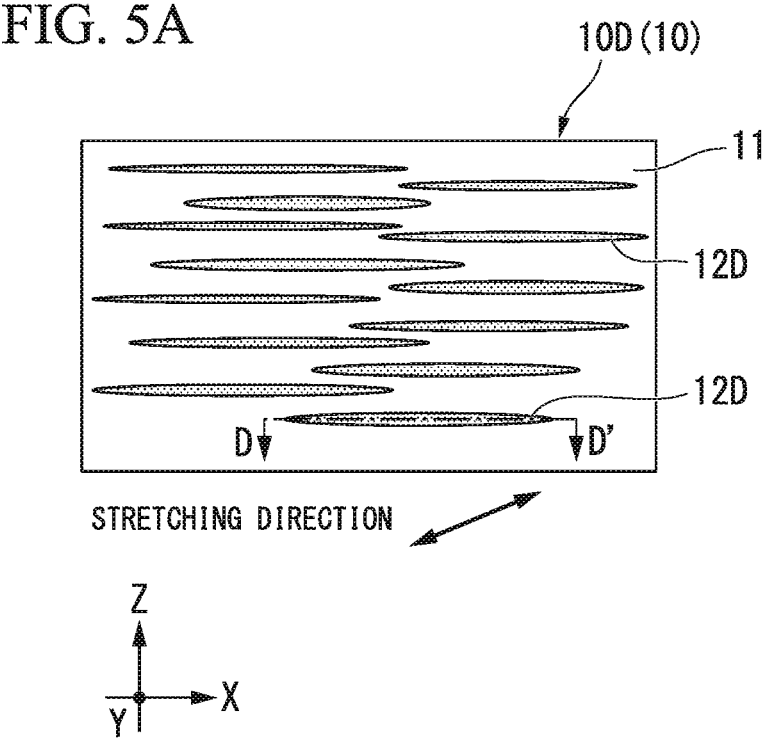
FIG. 5A is an enlarged view of a cross section of a formed hollow container illustrated in FIG. 1E.

Here. FIG. 5A illustrates a cross-sectional view of the formed hollow container 10D. As illustrated in FIG. 5A, in the hollow container 10D, the dispersion state of meta-xylylene group-containing polyamides 12D in the polyolefin 11 exhibits a layered state where the major axes of the meta-xylylene group-containing polyamides 12D having flaky surface shapes are aligned in the stretching direction. In other words, in the hollow container 10D, the meta-xylylene group-containing polyamides 12D are dispersed in the polyolefin 11 so as to be in a layered state in the thickness direction of the container.

Figure 5B:
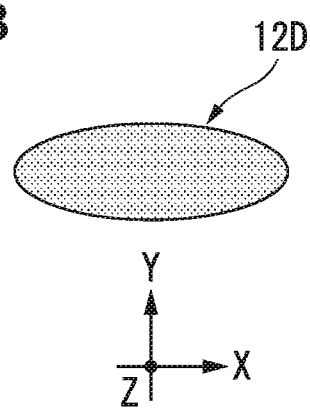
FIG. 5B is a cross-sectional view taken along line illustrated in FIG. 5A.

In addition, FIG. 5B illustrates a cross section taken along line D-D' illustrated in FIG. 5A. As illustrated in FIG. 5B, when the meta-xylylene group-containing polyamides 12D in the hollow container 10D are viewed in a cross-sectional view, in a direction perpendicular to the thickness direction of the container, the meta-xylylene group-containing polyamides 12D have elliptic shapes having the major axes in the stretching direction. That is, the meta-xylylene group-containing polyamides 12D in the hollow container 10D have shapes close to generally flaky surface shapes.

Incidentally, in the manufacturing method according to the present embodiment, in order to obtain hollow container having excellent barrier properties, it is important that the meta-xylylene group-containing polyamides are dispersed in the resin composition so as to have flaky surface shapes. In addition, in order to molding a hollow container having stable performance at all times, even if the molding conditions fluctuate in some extent, it is necessary to prevent the fluctuation of the dispersion state of the meta-xylylene group-containing polyamides in the resin composition.

In addition, in the manufacturing method for the present embodiment, in the compression molding step and the stretching step described above, it is important that the meta-xylylene group-containing polyamides in the resin composition are deformed so as to have flaky surface shapes. Therefore, in consideration of the temperature at which softening of the meta-xylylene group-containing polyamides starts, it is necessary to set the mold temperature in the compression molding step and to reheat the preform 10B before the stretching step.

<Hollow Container>

Next, the configuration of the hollow container according to the present embodiment will be described.

Figure 6:
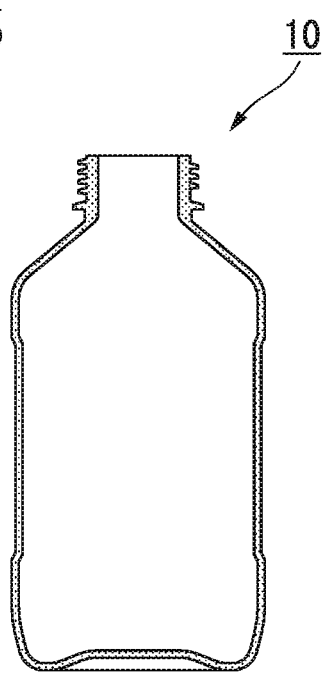
FIG. 6 is a sectional view schematically illustrating the hollow container according to the embodiment of the present invention.

FIG. 6 is a cross-sectional view of a hollow container 10 that is the embodiment in which the present invention is applied.

The hollow container 10 according to the present embodiment is a single-layer hollow container resulted through the aforementioned compression stretch blow molding method by molding a resin composition obtained by melting and mixing 60 to 90% by mass of polyolefin, 2 to 35% by mass of meta-xylylene group-containing polyamides, and 5 to 30% by mass of modified polyolefin.

The hollow container 10 according to the present embodiment is obtained by molding the resin composition through the compression stretch blow molding method as described above. Therefore, in the resin composition, the meta-xylylene group-containing polyamides are dispersed so as to have flaky surface shapes and form an oxygen barrier layer. Accordingly, a single-layer hollow container having excellent oxygen barrier properties and solvent properties is realized.

As the oxygen barrier properties of the hollow container according to the present embodiment, specifically, for example, when the average wall thickness of the body portion of the container is 1.0 mm, oxygen permeability of the container measured through the MOCON method is equal to or less than 0.01 (ml/each/day). In addition as the solvent barrier properties of the hollow container according to the present embodiment, specifically, for example, when the average wall thickness of the body portion of the container is 0.6 mm, the toluene permeation amount is 0.02 (g/each/day).

The shape of the hollow container according to the present embodiment is not particularly limited. Specifically, for example, various shapes such as a bottle shape, a cup shape, a tray shape, and a tank shape can be employed.

Subsequently, the structure of the hollow container produced through the compression stretch blow method will be described in detail.

As illustrated in FIGS. 2A, 3A, 4A, and 5A, the meta-xylylene group-containing polyamides 12 are dispersed insularly in the polyolefin 11, the meta-xylylene group-containing polyamides 12 having island shapes are stretched via the step of compression stretch blow have flaky surface shapes.

In the present embodiment, in a case where each of the vertical length (the maximum size in the X-direction FIGS. 1A to 5) of each of the meta-xylylene group-containing polyamides 12 dispersed in the polyolefin 11 in a state of being melted and kneaded in the extruder (hereinafter, will be referred to as the initial state), the horizontal length (the maximum size in the Y-direction in the same), and the thickness (the maximum size in the Z-direction in the same) is 1, the shapes of the meta-xylylene group-containing polyamides 12 change as follows.

First, when the resin composition is extruded from the extruder, the meta-xylylene group-containing polyamides 12A are deformed such that the vertical lengths become 1.5 and the horizontal lengths and the thicknesses become approximately 0.8, with respect to the initial state (FIGS. 1A, 2A, and 2B).

Subsequently, when the extruded resin composition is caused to flow and is solidified by using a mold, the meta-xylylene group-containing polyamides 12B are deformed such that the vertical lengths range from 3.0 to 4.5 and the horizontal lengths and the thicknesses range from 0.5 to 0.6, with respect to the initial state (FIGS. 1B, 3A, and 3B).

Moreover, when the obtained preform 10B is stretched in the vertical direction by using the stretching rod 3, the meta-xylylene group-containing polyamides 12C are deformed such that the vertical lengths range from 3.3 to 15.8 and the horizontal lengths and the thicknesses range from 0.3 to 0.6, with respect to the initial state (FIGS. 1D, 4A, and 4B).

When the stretched preform 10C is blow-molded, the meta-xylylene group-containing polyamides 12D are deformed such that the vertical lengths range from 3.3 to 15.8, the horizontal lengths range from 0.5 to 2.0, and the thicknesses range from 0.03 to 0.6, with respect to the initial state (FIGS. 1D, 4A, and 4B). Thus, a hollow container is completed. In addition, in a case where the area of the meta-xylylene group-containing polyamide 12D in the surface direction parallel to the vertical direction and the transverse direction in the initial state is 1, the area ranges from 1.7 to 31.6.

Hereinafter, a case where the initial state is 1, each proportion of the meta-xylylene group-containing polyamide in a finally obtained hollow container sometimes referred to as "the degree of stretch".

The meta-xylylene group-containing polyamide in the initial state has a shape close to a generally spherical body. The vertical length, the horizontal length, and the thickness are substantially equal to each other. Therefore, the proportion of the meta-xylylene group-containing polyamide dispersed in the polyolefin of the finally obtained hollow container may be expressed as the vertical length:the horizontal length:the thickness=3.3 to 15.8:0.5 to 2.0:0.03 to 0.6.

In contrast, in the hollow container produced through direct blow, with respect to the initial state, the vertical length of the meta-xylylene group-containing polyamide 12 is 1.5, the horizontal length ranges from 0.8 to 2.0, and the thickness ranges from 0.3 to 0.8. Therefore, the area in the surface direction parallel to the vertical direction and the transverse direction only ranges approximately from 1.2 to 3.0.

That is, in the present embodiment, since the compression stretch blow method is adopted, the exclusive areas of the meta-xylylene group-containing polyamides 12 in the polyolefin 11 in a direction parallel to the vertical direction and the transverse direction (a direction perpendicular to the thickness direction Z) increase. Accordingly, permeation of oxygen, a solvent, and the like in the thickness direction of the hollow container can be restrained. Thus, it is possible to obtain a hollow container having excellent oxygen barrier properties and solvent barrier properties.

From a view point of attaining higher oxygen barrier properties and solvent barrier properties, with respect to the initial state, in each of the meta-xylylene group-containing polyamides 12D dispersed in the finally obtained hollow container, it is preferable to adjust the conditions of the compression stretch blow such that the vertical length ranges from 4.5 to 15.8, the horizontal length ranges from 1.0 to 2.0, and the thickness ranges from 0.03 to 0.25. It is more preferable to adjust the conditions of the compression stretch blow such that the vertical length ranges from 9.0 to 15.8, the horizontal length ranges from 1.5 to 2.0, and the thickness ranges from 0.03 to 0.1.

In the present embodiment, it is not necessary for all of the meta-xylylene group-containing polyamides 12 dispersed in the hollow container to satisfy the aforementioned conditions. It is acceptable as long as there are equal to or more than 50% of the meta-xylylene group-containing polyamides 12 satisfying the conditions among the meta-xylylene group-containing polyamides 12 present in the hollow container. Accordingly, it is possible to attain more favorable oxygen barrier properties and solvent barrier properties.

As described above, according to the hollow container of the present embodiment, since the resin composition obtained by melting and mixing the polyolefin, the meta-xylylene group-containing polyamides, and the modified polyolefin is molded through the compression stretch blow molding method, it is possible to provide a single-layer hollow container having excellent oxygen barrier properties and solvent barrier properties.

In addition, the method for manufacturing a hollow container according to the present embodiment is the compression stretch blow method including the step of forming the preform by compression-molding the resin composition which can be obtained by melting and mixing the polyolefin, the meta-xylylene group-containing polyamides, and the modified polyolefin; the step of stretching the preform; and the step of blow-molding the stretched preform. Therefore, it is possible to improve the productivity of the single-layer hollow container having excellent oxygen barrier properties and solvent barrier properties.

According to the method for manufacturing a hollow container of the present embodiment, after the aforementioned resin composition is extruded into the mold for forming a preform, stretch blowing is performed. Therefore, in a state of the preform, even though the meta-xylylene group-containing polyamides in the resin composition (particularly, the polyolefin) are not neatly dispersed in a layered manner, the meta-xylylene group-containing polyamides can be neatly dispersed in a layered manner through the stretch blow.

In addition, according to the compression stretch blow method which is the method for manufacturing a hollow container of the present embodiment, compared to the molding method performed through the direct blow method in the related art, the cooling time, the blow time, and the like can be shortened. Therefore, mass productivity can be improved. Specifically, in the direct blow method in the related art, approximately one hundred hollow containers can be obtained per hour in a case of using a mold manufacturing two articles. In contrast, in the compression stretch blow method, a mold manufacturing twenty articles is used. Therefore, it is possible to obtain approximately one thousand hollow containers, that is, simply 10 times per hour.

Moreover, since the blow time and the cooling time are shortened, it is possible to produce approximately ten thousand to twenty thousand hollow containers per hour. In addition, the precision of the size of the container mouth portion can also be improved to a level equal to the precision of the mouth portion manufactured through injection molding precision level is improved from 0.1 mm to 0.01 mm).

The technical range of the present invention is not limited to the above-described embodiment, and various changes can be added without departing from the gist and the scope of the present invention.

EXAMPLE

Hereinafter, with reference to Examples, the present invention will be more specifically described. However, the present invention is not limited to the following Examples.

<Production of Hollow Container>

In Examples and Comparative Examples described below, high density polyethylene is used as the polyolefin, MX nylon is used as the meta-xylylene group-containing polyamide, and an adhesive resin is used as the modified polyolefin.

Example 1

A resin composition (24 g) which contains the high density polyethylene (manufactured by KEIYO POLYETHYLENE CO., LTD., MFR 0.3, density 0.957), the MX nylon (manufactured by MITSUBISHI GAS CHEMICAL COMPANY, INC., MFR 0.5), and the adhesive resin (manufactured by MITSUI CHEMICALS, INC., MFR 2.1, density 0.927) and in which the compounding ratio of the high density polyethylene, the MX nylon, and the adhesive resin is set to 80:10:10 is used. Through the compression stretch blow method, a cylindrical hollow container (200 ml) having the average wall thickness of the body portion to be 1.0 mm is produced.

Example 2

A resin composition (10 g) which contains the high density polyethylene (the same as Example 1), the MX nylon (the same as Example 1), and the adhesive resin (the same as Example 1) and in which the compounding ratio of the high density polyethylene, the MX nylon, and the adhesive resin is set to 80:10:10 is used. Through the compression stretch blow method, a cylindrical hollow container (120 ml) having the average wall thickness of the body portion to be 0.6 mm is produced.

Example 3

A resin composition (40 g) which contains the high density polyethylene (the same as Example 1), the MX nylon (the same as Example 1), and the adhesive resin (the same as Example 1) and in which the compounding ratio of the high density polyethylene, the MX nylon, and the adhesive resin is set to 80:10:10 is used. Through the compression stretch blow method, a cylindrical hollow container (600 ml) having the average wall thickness of the body portion to be 0.6 mm is produced.

Comparative Example 1

A resin composition (24 g) which contains the high density polyethylene (the same as Example 1), the MX nylon (the same as Example 1), and the adhesive resin (the same as Example 1) and in which the compounding ratio of the high density polyethylene, the MX nylon, and the adhesive resin is set to 80:10:10 is used. Through the direct blow method, a cylindrical hollow container (200 ml) having the average wall thickness of the body portion to be 1.0 mm is produced.

Comparative Example 2

The high density polyethylene (24 g) (the same as Example 1) is used. Through the direct blow method, a cylindrical hollow container (200 ml) having the average wall thickness of the body portion to be 1.0 mm is produced.

Comparative Example 3

A resin composition (10 g) which contains the high density polyethylene (the same as Example 1), the MX nylon (the same as Example 1), and the adhesive resin (the same as Example 1) and in which the compounding ratio of the high density polyethylene, the MX nylon, and the adhesive resin is set to 80:10:10 is used. Through the direct blow method, a cylindrical hollow container (120 ml) having the average wall thickness of the body portion to be 0.6 mm is produced.

Comparative Example 4

The high density polyethylene (10 g) (the same as Example 1) is used. Through the direct blow method, a cylindrical hollow container (120 ml) having the average wall thickness of the body portion to be 0.6 mm is produced.

Comparative Example 5

A resin composition (40 g) which contains the high density polyethylene (the same as Example 1), the MX nylon (the same as Example 1), and the adhesive resin (the same as Example 1) and in which the compounding ratio of the high density polyethylene, the MX nylon, and the adhesive resin is set 80:10:10 is used. Through the direct blow method, a cylindrical hollow container (500 ml) having the average wall thickness of the body portion to be 0.6 mm is produced.

Comparative Example 6

The high density polyethylene (40 g) (the same as Example 1) is used. Through the direct blow method, a cylindrical hollow container (500 ml) having the average wall thickness of the body portion to be 0.6 mm is produced.

<Evaluation Test 1>

In the hollow containers of Example 1 and Comparative Examples 1 and 2, oxygen permeability (in conformity to JIS K7126, the MOCON method, temperature 30° C., humidity 70% RH) is measured. The result is shown in the following Table 1.

TABLE 1

| | Resin composition | Molding method | Oxygen permeability (ml/each/day) | Degree of stretch | | |
|---|---|---|---|---|---|---|
| | | | | X | Y | Z |
| Example 1 | HDPE + MX nylon + modified PE | Compression stretch blow method | 0.01 | 4.5 | 1.0 | 0.2 |
| Comparative Example 1 | HDPE + MX nylon + modified PE | Direct blow method | 0.03 | 1.5 | 1.0 | 0.7 |
| Comparative Example 2 | HDPE | Direct blow method | 0.3 | — | — | — |

As shown in Table 1, it is found that the hollow container of Comparative Example 1 is approximately ten times more excellent than the hollow container (single-layer HDPE) of Comparative Example 2 in the oxygen barrier properties.

In addition, as shown in Table 1, it is found that the hollow container of Example 1 is approximately three times more excellent than the hollow container of Comparative Example 1 using the same resin composition in the oxygen barrier properties. The reason is that due to the compression stretch blow method, the hollow container of Example 1 is further stretched in the axial direction (the X-direction) of the container than the hollow container of the comparative example, and the MX nylon in the high density polyethylene is thinner and is distributed in a layered manner.

Specifically, as shown in Table 1, compared to Comparative Example 2 in which no MX nylon is contained, since the MX nylon is contained, Comparative Example 1 is more excellent in the oxygen barrier properties. Moreover, compared to Comparative Example 1, due to the compression stretch blow method, since the degree of stretch of the MX nylon in the X-direction is approximately three times greater, the surface area in the XY-direction increases. Thus, Example 1 is more excellent in the oxygen barrier properties.

<Evaluation Test 2>

In the hollow containers of Example 2 and Comparative Examples 3 and 4, solvent permeability is measured. As the evaluation procedure, the hollow containers of Example 2 and Comparative Examples 3 and 4 are filled with toluene (110 ml), and the mouth portions are sealed with aluminum film seal. Then, the containers are kept for 14 days in a thermostatic chamber at 40° C. Thereafter, the change of the weight of the container is measured, and the permeation amount of toluene is calculated. The result is shown in the following Table 2.

TABLE 2

| | Resin composition | Molding method | Toluene permeation amount (g/each/day) | Deformation of container | Degree of stretch | | |
|---|---|---|---|---|---|---|---|
| | | | | | X | Y | Z |
| Example 2 | HDPE + MX nylon + modified PE | Compression stretch blow method | 0.02 | Absent | 4.5 | 1.0 | 0.2 |
| Comparative Example 3 | HDPE + MX nylon + modified PE | Direct blow method | 0.08 | Present (little) | 1.5 | 1.0 | 0.7 |
| Comparative Example 4 | HDPE | Direct blow method | 3.00 | Present (much) | — | — | — |

As shown in Table 2, it is found that the hollow container of Comparative Example 3 is approximately 40 times more excellent than the hollow container (single-layer HDPE) of Comparative Example 4 in the solvent barrier properties.

In addition, as shown in Table 2, it is found that the hollow container of Example 2 is approximately four times more excellent than the hollow container of Comparative Example 3 using the same resin composition in the solvent barrier properties.

In addition, in regard to the appearance of the container after the test, a slight deformation is checked in the hollow container of Comparative Example 3, and the hollow container of Comparative Example 4 is significantly deformed. In contrast, in the hollow container of Example 2, no deformation is checked.

The reason is that due to the compression stretch blow method, the hollow container of Example 2 is further stretched in the axial direction (the X-direction) of the container than the hollow container of the comparative example, and the MX nylon in the high density polyethylene: is thinner and is distributed in a layered manner.

Specifically, as shown in Table 2, compared to Comparative Example 4 in which no MX nylon is contained, Comparative Example 3 containing the MX nylon is more excellent in the solvent barrier properties. Moreover, in Example 2, compared to Comparative Example 1, due to the compression stretch blow method, since the degree of stretch of the MX nylon in the X-direction is approximately three times greater, the surface area in the XY-direction increases, thereby being more excellent in the solvent barrier properties.

<Evaluation Test 3>

In the hollow containers of Example 3 and Comparative Examples 5 and 6, solvent permeability is measured. As the evaluation procedure, the hollow containers of Example 3 and Comparative Examples 5 and 6 are filled with toluene (600 ml), and the mouth portions are sealed with aluminum film seal. Then, the containers are kept for 14 days in a thermostatic chamber at 40° C. Thereafter, the change of the weight of the container is measured, and the permeation amount of toluene is calculated. The result is shown in the following Table 3.

5 using the same resin composition in the solvent barrier properties.

In addition, in regard to the appearance of the container after the test, deformations checked in the hollow containers of Comparative Examples 5 and 6. In contrast, in the hollow container Example 3, no deformation is checked.

The reason is that due to the compression stretch blow method, the hollow container of Example 3 is further stretched in the axial direction (the X-direction) of the container than the hollow container of the comparative example, and the MX nylon in the high density polyethylene is thinner and is distributed in a layered manner.

Specifically, as shown in Table 3, compared to Comparative Example 6 in which no MX nylon is contained. Comparative Example 5 containing the MX nylon is more excellent in the solvent barrier properties. Moreover, in Example 3, compared to Comparative Example 5, due to the compression stretch blow method, since the degrees of stretch of the MX nylon in the X-direction is approximately six times greater and the same in the Y-direction is approximately 1.5 times greater, the surface area in the XY-direction increases, thereby being more excellent in the solvent properties.

What is claimed is:

1. A hollow container comprising:
   a resin composite including 60% to 90% of polyolefin by mass, 2% to 35% of meta-xylylene group-containing polyamide parts by mass, and 5% to 30% of modified polyolefin by mass, with respect to mass of the resin composite,
   wherein
   the meta-xylylene group-containing polyamide parts are dispersed to be apart from each other in the polyolefin, and
   a proportion of a vertical length, a horizontal length, and a thickness, of each of the meta-xylylene group-containing polyamide parts dispersed in the polyolefin, satisfies:
   the vertical length:the horizontal length:the thickness
   =3.3 to 15.8:0.5 to 2.0:0.03 to 0.6.

TABLE 3

| | Resin composition | Molding method | Toluene permeation amount (g/each/day) | Deformation of container | Degree of stretch X | Y | Z |
|---|---|---|---|---|---|---|---|
| Example 3 | HDPE + MX nylon + modified PE | Compression stretch blow method | 0.05 | Absent | 9.0 | 1.5 | 0.1 |
| Comparative Example 5 | HDPE + MX nylon + modified PE | Direct blow method | 0.2 | Present | 1.5 | 1.0 | 0.7 |
| Comparative Example 6 | HDPE | Direct blow method | 6 | Present | — | — | — |

As shown in Table 3, it is found that the hollow container of Comparative Example 5 is approximately 30 times more excellent than the hollow container than the hollow container (single-layer HDPE) of Comparative Example 6 in the solvent barrier properties.

In addition, as shown in Table 3, it is found that the hollow container of Example 3 is approximately four times more excellent than the hollow container of Comparative Example 2. The hollow container according to claim 1,
   wherein when an average wall thickness of a body portion of the hollow container is 0.3 mm, oxygen permeability of the hollow container measured through a MOCON method is equal to or less than 0.03 ml/each/day.

3. The hollow container according to claim 1,
   wherein the polyolefin is high density polyethylene.

4. The method for manufacturing the hollow container according to claim 1, wherein before the preform is stretched, the preform is reheated.

5. The method for manufacturing the hollow container according to claim 1,
wherein high density polyethylene is used as the polyolefin.

6. A method for manufacturing a hollow container, comprising:
preparing a resin composite including meta-xylylene group-containing polyamide parts dispersed to be apart from each other in polyolefin, which is obtained by melting and mixing 60 to 90% of polyolefin by mass, 2 to 35% of meta-xylylene group-containing polyamides by mass, and 5 to 30% of modified polyolefin by mass, with respect to mass of the resin composite;
forming a preform by compression-molding the resin composite;
stretching the preform; and
blow-molding the stretched preform,
wherein a proportion of a vertical length, a horizontal length, and a thickness, of each of the meta-xylylene group-containing polyamide parts dispersed in the polyolefin after the blow-molding, satisfies:
the vertical length: the horizontal length: the thickness =3.3 to 15.8: 0.5 to 2.0: 0.03 to 0.6.

* * * * *

UNITED STATES PATENT AND TRADEMARK OFFICE
CERTIFICATE OF CORRECTION

PATENT NO. : 10,781,010 B2  
APPLICATION NO. : 15/450340  
DATED : September 22, 2020  
INVENTOR(S) : Fukushima et al.

It is certified that error appears in the above-identified patent and that said Letters Patent is hereby corrected as shown below:

In the Specification

Column 1, Line 8 (approx.):
Delete "PCT/W2015/075413," and insert -- PCT/JP2015/075413, --, therefor.

Column 1, Line 10 (approx.):
Delete "No," and insert -- No. --, therefor.

Signed and Sealed this  
Nineteenth Day of January, 2021

Andrei Iancu  
*Director of the United States Patent and Trademark Office*